(12) United States Patent
Lu

(10) Patent No.: US 7,558,451 B2
(45) Date of Patent: Jul. 7, 2009

(54) OPTICAL FIBER LINE ARRANGING GUIDE GROOVE CAPABLE OF SENSING OPTICAL SIGNALS

(75) Inventor: Kevin Lu, Taipei (TW)

(73) Assignee: Inventec Multimedia & Telecom (Tianjin) Co., Ltd. (CN)

( * ) Notice: Subject to any disclaimer, the term of this patent is extended or adjusted under 35 U.S.C. 154(b) by 9 days.

(21) Appl. No.: 11/898,817

(22) Filed: Sep. 17, 2007

(65) Prior Publication Data

US 2009/0074366 A1    Mar. 19, 2009

(51) Int. Cl.
*G02B 6/26* (2006.01)

(52) U.S. Cl. .............................. 385/32; 385/27; 385/30; 385/48; 385/120

(58) Field of Classification Search ............. 385/27–32, 385/48, 42–43, 88–92
See application file for complete search history.

(56) References Cited

U.S. PATENT DOCUMENTS 4,253,727 A * 3/1981 Jeunhomme et al. .......... 385/37
4,672,198 A * 6/1987 Presby ....................... 356/73.1

* cited by examiner

*Primary Examiner*—Brian M. Healy
*Assistant Examiner*—Guy G Anderson
(74) *Attorney, Agent, or Firm*—Bacon & Thomas, PLLC

(57) ABSTRACT

An optical fiber line arranging guide groove capable of sensing optical signals is provided for detecting the status of optical signals in the optical fiber line. Through an optical detection circuit and a display element, the connection status of optical signals for the optical fiber line in the optical fiber line arranging guide groove is determined.

11 Claims, 7 Drawing Sheets

OPTICAL FIBER LINE ARRANGING GUIDE GROOVE CAPABLE OF SENSING OPTICAL SIGNALS

BACKGROUND OF THE INVENTION

1. Field of the Invention

The present invention relates to a line arranging guide groove, and more particularly to an optical fiber line arranging guide groove capable of sensing optical signals.

2. Related Art

Recently, as an increasingly large population is using Internet to receive and transmit data, the requirements for networks are significantly increased. Due to the properties of optical fiber communication architecture such as high bandwidth, high transmission quality, and multi-service compatibility, more and more users use network systems mainly based upon this architecture, and thus, the optical fiber communication architecture has become the most rapidly developed network transmission architecture.

Optical fiber lines in a machine room must be installed in great density because of the amount of existing optical fiber lines and the increasing number of users. Such numerous optical fiber lines are often disordered and difficult to arrange. As a result, the optical fiber lines are likely to be broken due to an unbearable total weight of other lines. In addition, due to the excessive and complicated optical fiber lines, if one line fails, much time and labor are needed to find out the fault and eliminate the fault. Therefore, a line arranging guide groove exclusively designed for the optical fiber lines is required, which can not only guide and arrange the excessive large number of optical fiber lines, but also display optical signals in the optical fiber lines on the arranging guide groove, and thus the user can easily and clearly detect the status of each optical fiber line.

Currently, the conventional line arranging guide groove in this field is generally used for arranging the optical fiber lines, however, the conventional line arranging guide groove is applicable for common copper lines, and particularly suitable for guiding the copper lines and sensing the internal signals, and displaying the signal transmission status in this line. Since the sensing of optical signals in the optical fiber lines is different from the conventional signal measuring process, the existed line arranging guide groove cannot be applied to the optical fiber lines.

SUMMARY OF THE INVENTION

In view of the problem in the prior art that the conventional arranging guide groove cannot be applied to the optical fiber line, the present invention is directed to an optical fiber line arranging guide groove capable of sensing optical signals.

According to the first embodiment of the present invention which has an upper guide groove with at least one arc-shaped depression and a lower guide groove having at least one notch in the center of a surface wherein the notches are used for placing the optical fiber lines. Moreover, the lower guide groove further has a hollow inverted U-shaped protrusion corresponding to the arc-shaped depressions of the upper guide groove respectively, and the hollow inverted U-shaped protrusions are used for supporting the optical fiber lines, such that the optical fiber lines are bent to a status that bending loss easily occurs. When the upper guide groove and the lower guide groove are closed together, the optical fiber lines are covered and fixed, and an accommodation space is further formed correspondingly when each of the hollow inverted U-shaped protrusions and the upper guide groove are closed together. At least one optical detection circuit is embedded in the accommodation spaces, for sensing transmission status of the optical signals within the optical fiber lines.

According to the second embodiment of the present invention which further has an upper guide groove with at least one arc-shaped depression, wherein the arc-shaped depressions have at least one first hole at an outer edge of a top end for accommodating at least one display element. The display elements are used for displaying status of optical signals in the corresponding optical fiber line. The arc-shaped depressions further have at least one set of first metal contact pairs at an outer edge, and an interior of the at least one set of first metal contact pairs is electrically connected to the corresponding display element.

Moreover, a lower guide groove with at least one notch at the center of a surface wherein the notches are used for placing the optical fiber lines. The lower guide groove further has a hollow inverted U-shaped protrusion corresponding to the arc-shaped depressions of the upper guide groove respectively. The hollow inverted U-shaped protrusions used for supporting the optical fiber lines have at least one accommodation space formed and further have at least one set of second metal contact pairs at an outer edge. When the upper guide groove and the lower guide groove are closed together, the optical fiber lines are covered and fixed, such that the optical fiber lines are bent to a status that bending loss easily occurs wherein an exterior of the second metal contact pairs is electrically connected to an interior of the first metal contact pair and the corresponding display element. Besides, at least one optical detection circuit for sensing the status of optical signals in the corresponding optical fiber line wherein the optical detection circuits are embedded into an accommodation space contained in the corresponding hollow inverted U-shaped protrusion, and electrically connected to the corresponding second metal contact pairs at the outer edge.

With the optical fiber line arranging guide groove capable of sensing optical signals according to the present invention, the optical fiber line is guided, the status of the optical signals in the optical fiber line is sensed, and the status information is displayed on the arranging guide groove, thereby achieving the effect of easy fault detection.

In order to make the aforementioned and other objects, features, and advantages of the present invention comprehensible, embodiments accompanied with figures are described in detail below.

DETAILED DESCRIPTION OF THE INVENTION

Figure 1:
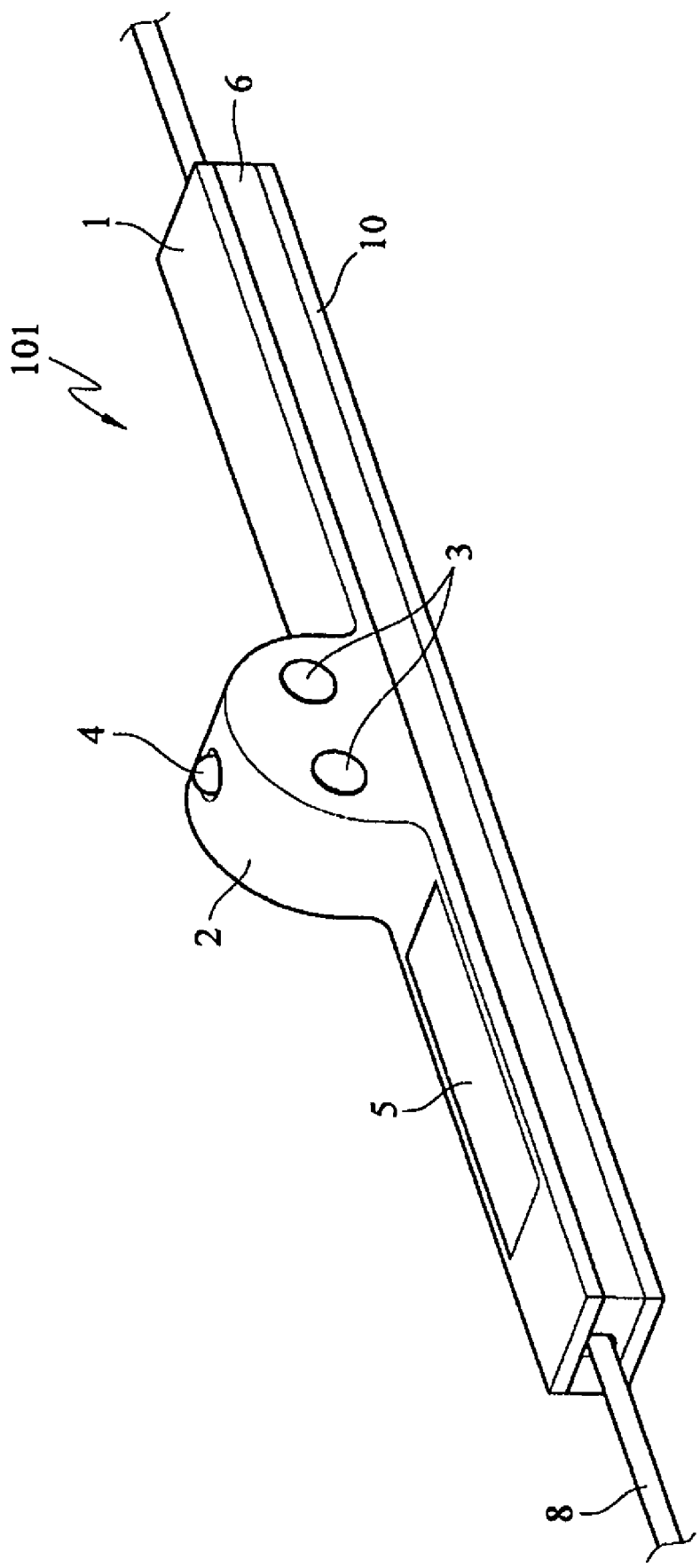
FIG. 1 is a schematic view of an optical fiber line arranging guide groove capable of sensing optical signals according to the present invention.

In a first embodiment of the present invention, for example, a single guide groove is used to guide an independent optical fiber line. As shown in FIG. 1, 101 is an optical fiber line arranging guide groove of the present invention, which includes an upper guide groove 1, a lower guide groove 6, an optical fiber line 8, and an adhering member 10. The upper guide groove 1 has an arc-shaped depression 2 disposed thereon, and the arc-shaped depression 2 has a display element 4 disposed thereon and has at least one set of first metal contact pairs 3 at an outer edge. The detailed inner structure and operation details of the optical fiber line arranging guide groove are illustrated with reference to FIGS. 2 and 3.

Figure 2:
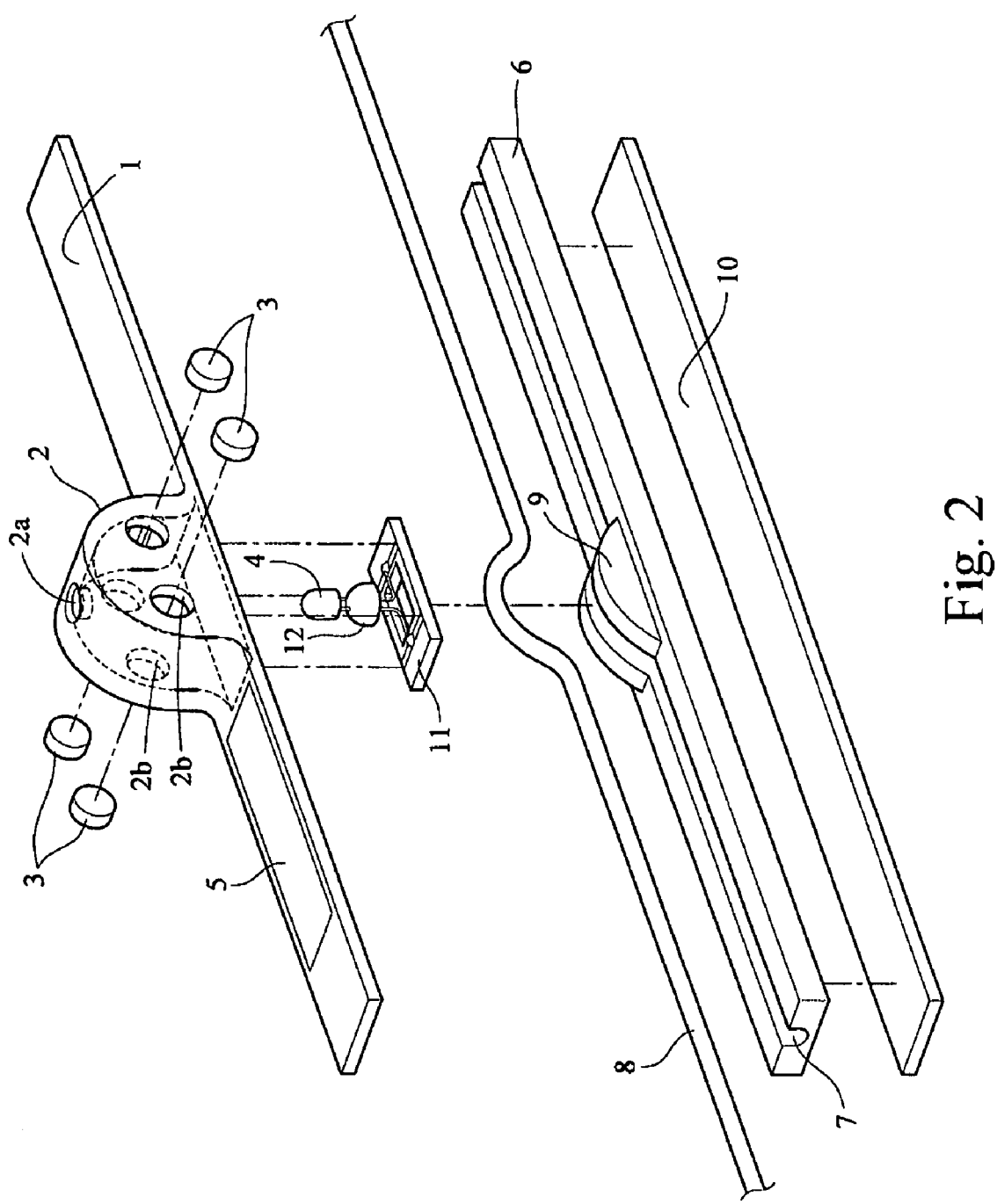
FIG. 2 is an exploded structural view of a guide groove according to a first embodiment of the present invention.

As shown in FIG. 2, in the optical fiber line arranging guide groove, the upper guide groove 1 can be of any shape, and it is a long upper cover in this embodiment. A first hole 2a is disposed at an upper edge of a top end of the arc-shaped depression 2 in the upper guide groove 1, for accommodating the display element 4; and two sets of second holes 2b are further disposed at an outer edge, for accommodating two sets of first metal contact pairs 3. The first metal contact pair 3 is made of magnetic metal, for serially connecting more than one optical detection circuit 11, and capable of being externally connected to a power source (not shown) to supply power required by the optical detection circuit 11, and further used for positioning and connecting more than one optical fiber line arranging guide groove. The upper guide groove 1 further has a label-adhering notch 5 for adhering optical fiber labels.

Figure 3:
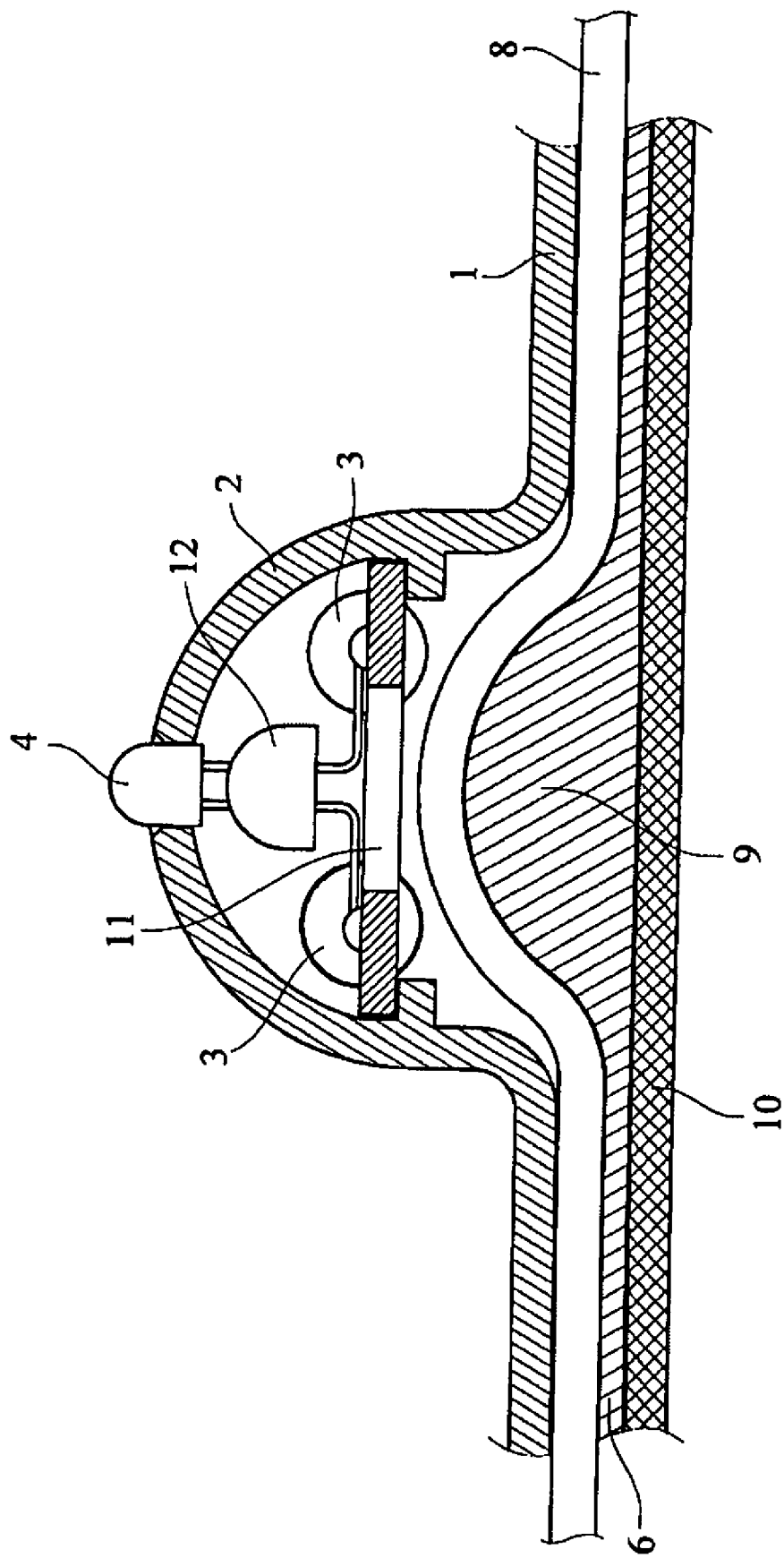
FIG. 3 is a detailed structural view of an optical detection circuit and the guide groove according to the first embodiment of the present invention.

A lower guide groove 6 can be of any shape, and it is a long base plate herein and has a notch 7 disposed at the center of a surface, for placing the optical fiber line 8. The lower guide groove 6 is further disposed with a hollow inverted U-shaped protrusion 9 at the position corresponding to the arc-shaped depression 2 of the upper guide groove 1. When the upper guide groove 1 and the lower guide groove 6 are closed together, the optical fiber line 8 is fixed in the notch 7 of the lower guide groove 6, and at this time, the hollow inverted U-shaped protrusion 9 and the arc-shaped depression 2 form an accommodation space upon being closed together. The accommodation space is used for accommodating an optical detection circuit 11, as shown in FIG. 3. The optical detection circuit 11 includes an optical sensing element 12 and a display element 4, and the display element 4 passes through the first hole 2a and is exposed above the arc-shaped depression 2. Furthermore, an adhering member 10 is further included under the base plate of the lower guide groove, for fixing the lower guide groove 6.

When the optical fiber line 8 is embedded along the notch 7 of the lower guide groove 6, a part of the line is bent along the undulation of the hollow inverted U-shaped protrusion 9, and at this time, the bending curvature radius of this part of the optical fiber line 8 is smaller than a critical curvature radius of the optical fiber line, and bending loss occurs to the optical fiber line 8.

When the bending loss occurs, the optical sensing element 12 of the optical detection circuit 11 detects an optical bending loss signal 15 (referring to FIGS. 5A and 5B), and thus determining the status of the optical signal 14 of the optical fiber line 8 sensed in optical fiber line arranging guide groove 101.

In this embodiment, the optical sensing element 12 is a photoelectric diode, and besides, a photoresistor or a phototransistor can also be selected. The display element 4 is an LED indicator in this embodiment, and besides, all elements having light-emitting and displaying functions can also be selected, such as a tungsten bulb, a quartz bulb, and a mercury bulb. Upon sensing the optical bending loss signal 15, the photoelectric diode generates a current according to a physical effect principle, and the current drives the LED indicator. When the LED indicator is lightened, it indicates that the transmission situation of the optical signal 14 in the optical fiber line 8 is in a normal condition. Moreover, the stronger the power of the optical signal 14 is, the stronger the power of the externally-refracted optical bending loss signal 15 is, i.e., the stronger the current generated by the photoelectric diode is. The user can determine the strength of the power for the optical signal 14 in the optical fiber line 8 according to the brightness of the LED indicator.

In the above embodiment, the optical detection circuit 11 is embedded into the accommodation space formed by the upper guide groove 1 and the lower guide groove 6 when they are closed together, and in another embodiment, the optical detection circuit 11 can also be received in the accommodation space formed within the hollow inverted U-shaped protrusion 9 disposed in the lower guide groove 6.

Figure 4A:
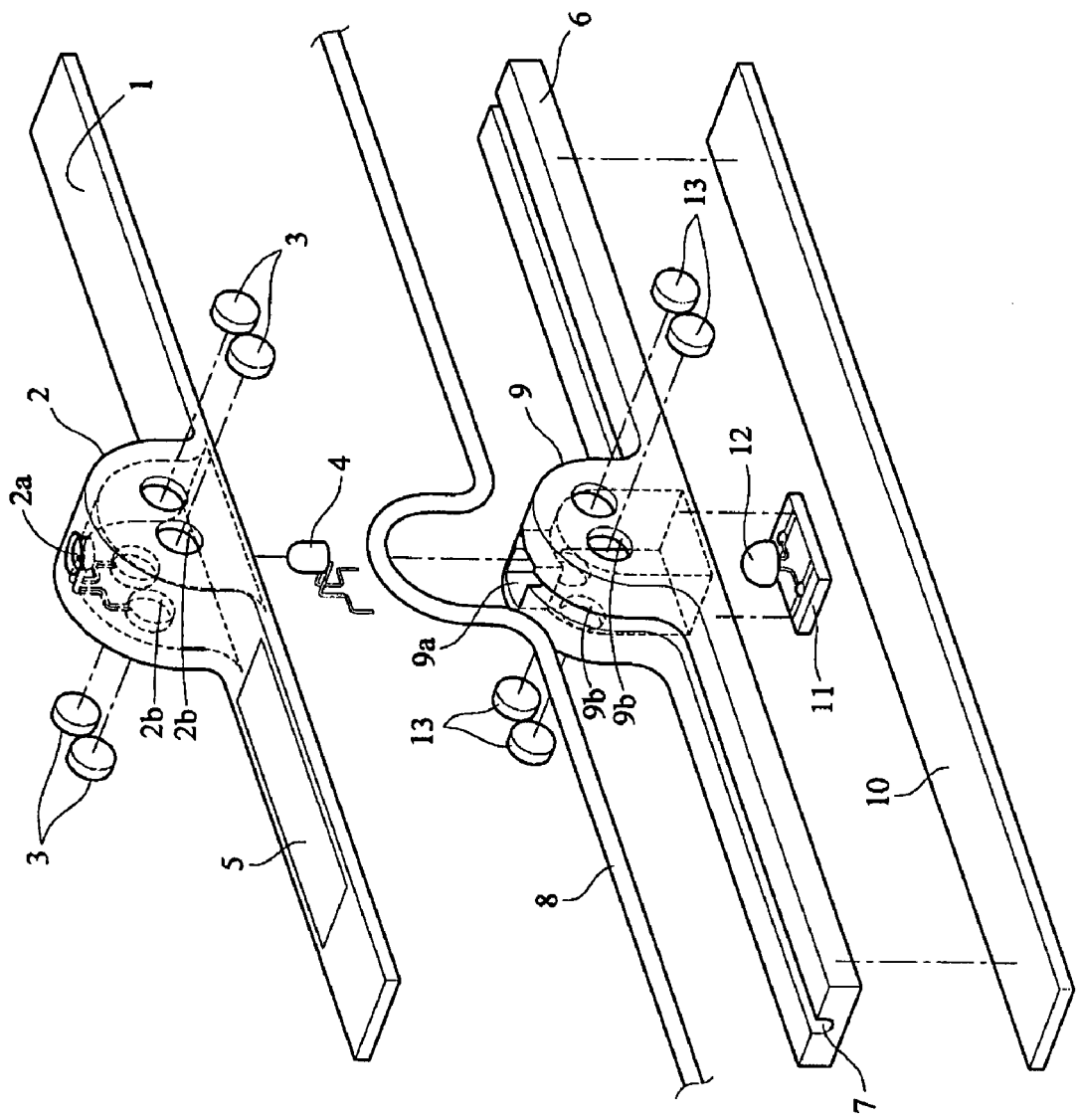
FIG. 4A is an exploded structural view of a guide groove according to a second embodiment of the present invention.

FIG. 4A shows a second embodiment of the present invention, whose external appearance is identical to that described in FIG. 1, but the inner structure and operation details are described with reference to FIGS. 4A, 4B, and 4C.

As shown in FIG. 4A, in the optical fiber line arranging guide groove, the upper guide groove 1 can be of any shape, and it is a long upper cover in this embodiment. A first hole 2a is disposed at an upper edge of a top end of the arc-shaped depression 2 included in the upper guide groove 1, for accommodating the display element 4. The display element 4 passes through the first hole 2a and is exposed above the arc-shaped depression 2. Two sets of second holes 2b are further disposed at an outer edge, for accommodating two sets of first metal contact pairs 3. The first metal contact pair 3 is made of magnetic metal, for serially connecting more than one optical detection circuit 11, and capable of being externally connected to a power source (not shown) to supply power required by the optical detection circuit 11, and used for positioning and connecting more than one the optical fiber line arranging guide groove. It should be noted that, in this embodiment, the display element 4 is connected to internal circuits of the two sets of first metal contact pairs 3, as shown in FIGS. 4B and 4C. In this embodiment, the display element 4 is an LED indicator, and besides, all elements having light-emitting and displaying functions can also be selected, such as a tungsten bulb, a quartz bulb, and a mercury bulb. The upper guide groove 1 further has a label-adhering notch 5 for adhering optical fiber labels.

In this embodiment, an optical detection circuit 11 is embedded into the hollow inverted U-shaped protrusion 9 of the lower guide groove 6, and the optical detection circuit 11 includes an optical sensing element 12. The hollow inverted U-shaped protrusion 9 is opened with a third hole 9a at a top end thereof, and has two sets of fourth holes 9b disposed at an outer edge for accommodating two sets of second metal contact pairs 13. When the optical fiber line 8 is embedded along the notch 7 included in the lower guide groove 6, a part of the line is bent along the undulation of the hollow inverted U-shaped protrusion 9. After the upper guide groove 1 is closed to fix the optical fiber line 8, the bending loss phenomenon occurs for this bent part of optical fiber line 8, as described in the first embodiment, thereby generating the optical bending loss signal 15. The formation of the bending loss is the same as that described in the first embodiment, referring to FIGS. 5A and 5B. Once bending loss occurs to the optical fiber line 8, the optical bending loss signal 15 is transmitted to the optical sensing element 12 of the optical detection circuit 11 through the third hole 9a opened in the hollow inverted U-shaped protrusion 9.

In this embodiment, in terms of sensing the optical bending loss signal 15, the optical bending loss signal 15 is sensed by the optical sensing element 12 by means of being transmitted through the third hole 9a. Alternatively, the hollow inverted U-shaped protrusion 9 is made of a light-transmissive material instead, and meanwhile, the optical sensing element 12 can directly sense the optical bending loss signal 15 through the light-transmissive material, thereby achieving the same signal-sensing purpose. In addition, the optical sensing element 12 may be a photoelectric diode, and besides, a photoresistor or a phototransistor can be selected to serve as the optical sensing element 12.

Figure 4C:
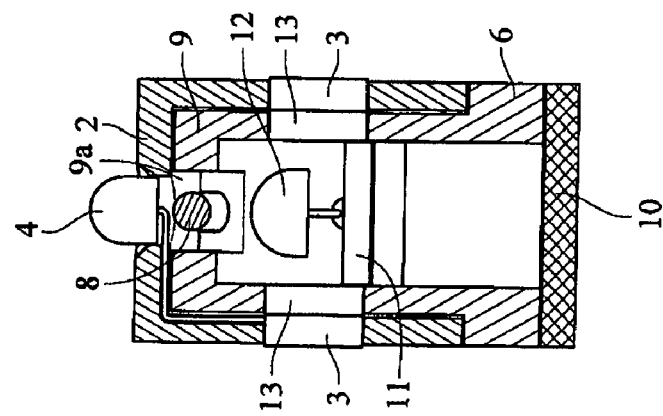
FIG. 4C is a longitudinal-sectional view of the optical detection circuit and the guide groove according to the second embodiment of the present invention.
Figure 4B:
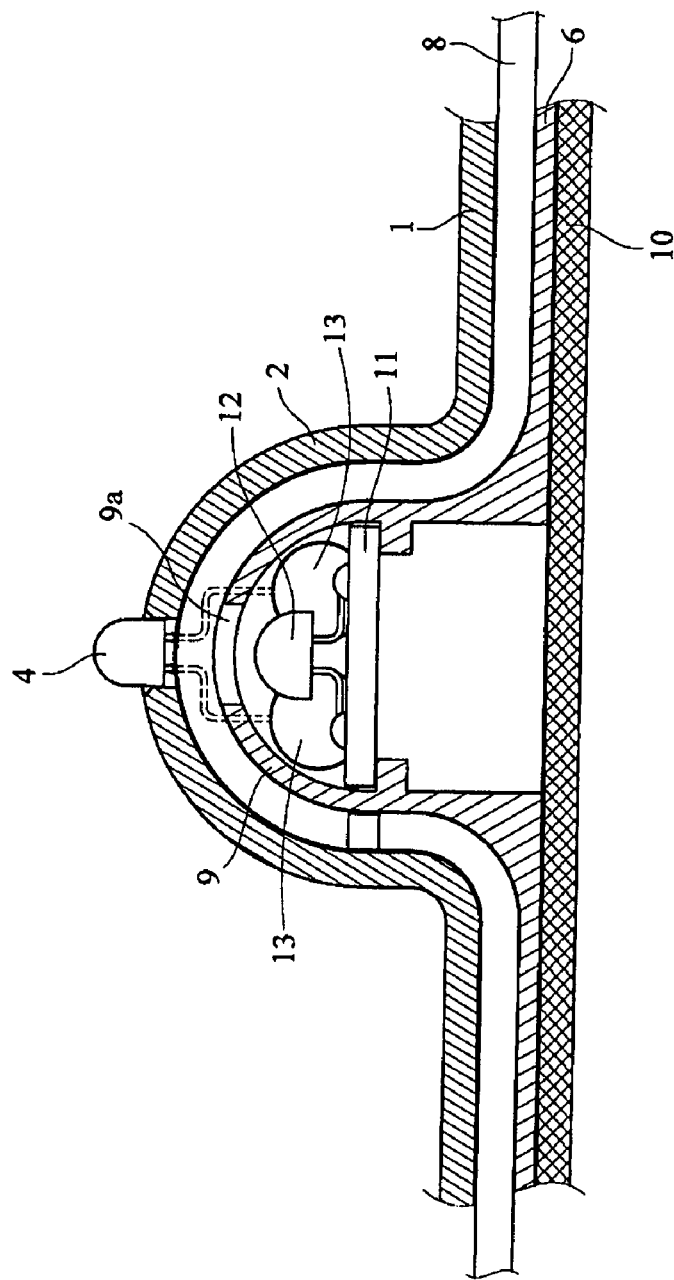
FIG. 4B is a cross-sectional view of an optical detection circuit and the guide groove according to the second embodiment of the present invention.

When the upper guide groove 1 is closed for fixing the optical fiber line 8, two sets of first metal contact pairs 3 of the arc-shaped depression 2 are connected with two sets of second metal contact pairs 13 of the lower guide groove, that is, the LED indicator is electrically connected to the optical detection circuit 11, as shown in FIGS. 4B and 4C. After the optical fiber line is fixed, the optical bending loss signal is then transmitted to the optical detection circuit 11 via the third hole 9a opened on the hollow inverted U-shaped protrusion 9, and at this time, the photoelectric diode senses the transmission status of the optical signal 14 in the optical fiber line 8. Upon sensing the optical bending loss signal, the photoelectric diode generates a current according to physical effect principle, and the current drives the LED indicator electrically connected to the circuit.

If the transmission situation of the optical signal in the optical fiber line is in a normal condition, the LED indicator on the upper cover is lightened. As described in the first embodiment, the user can determine the power status of the optical signal 14 in the optical fiber line according to the brightness of the LED indicator.

Figure 5B:
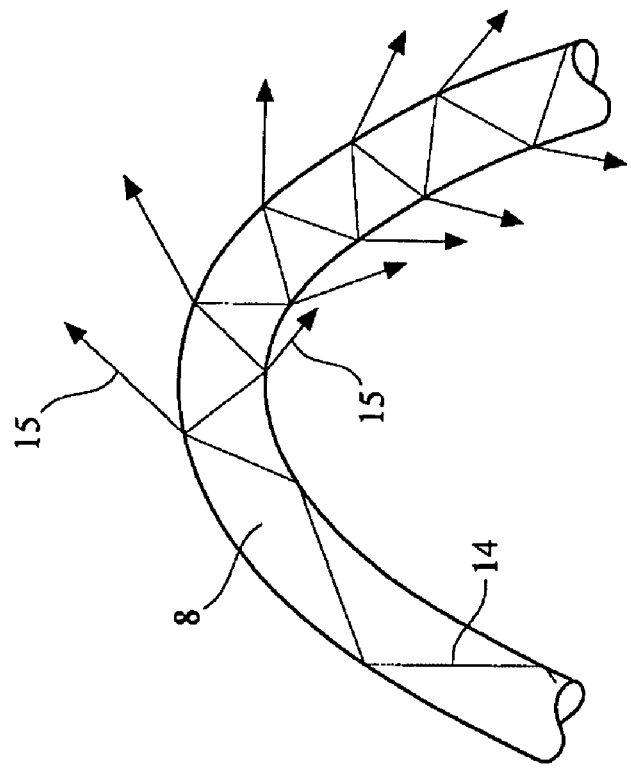
FIG. 5B is a schematic view of bending loss for the optical fiber line according to the present invention.
Figure 5A:
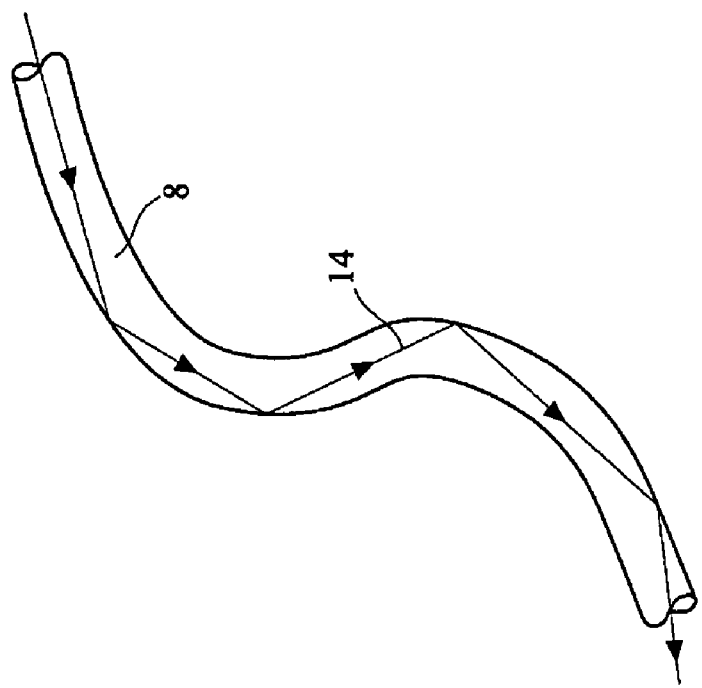
FIG. 5A is a schematic view of a normal transmission path for optical signals in the optical fiber line according to the present invention.

The bending loss phenomenon is demonstrated with reference to FIGS. 5A and 5B. FIG. 5A is a normal transmission path of the optical signal 14 in the optical fiber line 8. As shown in FIG. 5B, the optical fiber line 8 forms the transmission path shown in the figure due to the hollow inverted U-shaped protrusion 9, and at this time, the bending loss phenomenon occurs. When the bending loss occurs, the original transmission path for the optical signal 14 is changed, as shown in FIG. 5B, and at this time, the optical signal 14 is refracted externally from the core of the optical fiber line 8 after penetrating through a cladding, thereby generating the optical bending loss signal 15.

Figure 6:
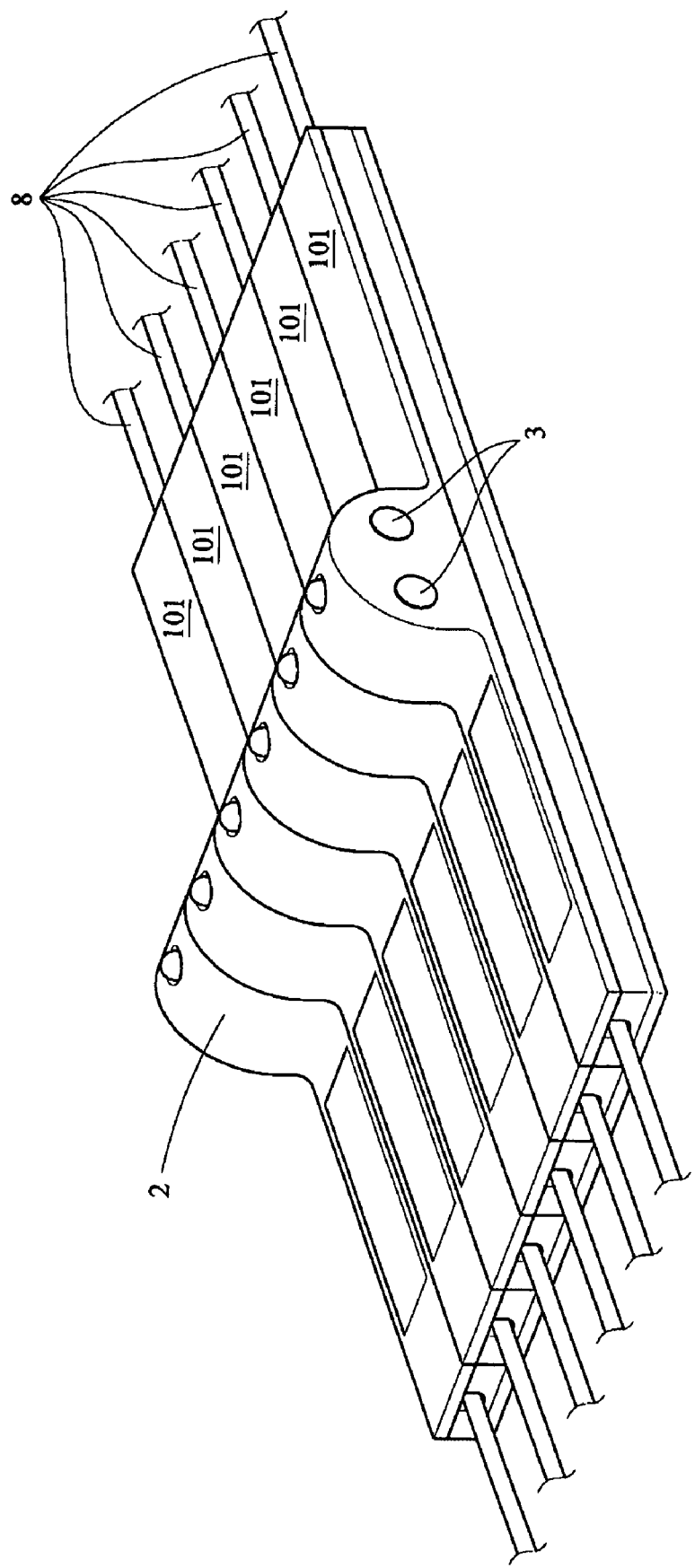
FIG. 6 is a schematic view of an application of the present invention.

FIG. 6 shows an application of the present invention, in which a plurality of optical fiber lines 8 to be guided is respectively placed in each corresponding optical fiber line arranging guide groove 101, and the architecture configured within each of the optical fiber line arranging guide groove 101 can be implemented as any one selected from the first embodiment and the second embodiment.

After all the optical fiber lines 8 to be guided have been fixed, each optical fiber line arranging guide groove 101 can be assembled and positioned by serially connecting the two sets of first metal contact pairs 3 in the arc-shaped depression 2 on the basis of the principle that unlike poles attract each other. It should be noted that, the two sets of first metal contact pairs 3 connected between guide grooves share positive and negative electricity depending upon the circuit parallel connection property, and the power source required by all the parallel-connected circuits is input from two sets of first metal contact pairs 3 arranged at one of the top end or tail end. With the two sets of first metal contact pairs 3 of each guide groove, all arranging guide groove constructions can be arranged tidily and orderly, and thus, the user can achieve the purpose of guiding the optical fiber lines, and determine the transmission status of optical signals in the guided optical fiber lines in the arranging guide groove construction according to the LED indicator on each arranging guide groove construction.

The above embodiments and application are all directed to demonstrating the process of using a single guide groove to guide a single optical fiber line. However, those skilled in the art can design an invention of placing a plurality of optical fiber lines in the same guide groove without departing from the technical means of the present invention in terms of guiding the optical fiber line and sensing the optical signal status in the optical fiber line, which is not limited in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber line arranging guide groove capable of sensing optical signals, applicable for guiding more than one optical fiber line and sensing status of optical signals in the optical fiber lines, comprising:

an upper guide groove, having at least one arc-shaped depression, wherein the arc-shaped depressions have at least one first hole at an outer edge of a top end thereof, for accommodating at least one display element, and the display elements are used for displaying status of optical signals in the corresponding optical fiber line; the arc-shaped depressions further have at least one set of first metal contact pairs at an outer edge, and an interior of the at least one set of first metal contact pairs is electrically connected to the corresponding display element;

a lower guide groove, having at least one notch at the center of a surface thereof, wherein the notches are used for placing the optical fiber lines; the lower guide groove further has a hollow inverted U-shaped protrusion corresponding to the arc-shaped depressions of the upper guide groove respectively; the hollow inverted U-shaped protrusions, used for supporting the optical fiber lines, have at least one accommodation space formed therein, and further have at least one set of second metal contact pairs at an outer edge thereof; when the upper guide groove and the lower guide groove are closed together, the optical fiber lines are covered and fixed, such that the optical fiber lines are bent to a status that bending loss easily occurs, wherein an exterior of the second metal contact pairs is electrically connected to an interior of the first metal contact pair and the corresponding display element; and at least one optical detection circuit, for sensing the status of optical signals in the corresponding optical fiber line, wherein the optical detection circuits are embedded into an accommodation space contained in the corresponding hollow inverted U-shaped protrusion, and electrically connected to the corresponding second metal contact pairs at the outer edge.

2. The optical fiber line arranging guide groove capable of sensing optical signals as claimed in claim 1, wherein the display elements, used for receiving optical signal status in the optical fiber lines sensed by the corresponding optical detection circuit, are selected from a group consisting of an LED indicator, a tungsten bulb, a quartz bulb, and a mercury bulb.

3. The optical fiber line arranging guide groove capable of sensing optical signals as claimed in claim 1, wherein the first metal contact pairs, made of magnetic metal, are used for serially connecting more than one optical detection circuit, capable of being externally connected to a power source to supply power required by the optical detection circuits, and for positioning and connecting more than one optical fiber line arranging guide groove.

4. The optical fiber line arranging guide groove capable of sensing optical signals as claimed in claim 1, wherein the arc-shaped depressions further comprise at least one set of second holes at a side edge thereof, for accommodating the first metal contact pairs.

5. The optical fiber line arranging guide groove capable of sensing optical signals as claimed in claim 1, wherein the upper guide groove further comprises at least one label-adhering notch for adhering optical fiber labels.

6. The optical fiber line arranging guide groove capable of sensing optical signals as claimed in claim 1, further comprising at least one adhering member disposed under a base plate of the lower guide groove, for fixing the lower guide groove.

7. The optical fiber line arranging guide groove capable of sensing optical signals as claimed in claim 1, wherein the hollow inverted U-shaped protrusions are opened with more than one set of third holes, such that the optical detection circuits receive optical bending loss signals refracted from an interior of the corresponding optical fiber line through the corresponding third hole when bending loss occurs to the corresponding optical fiber line.

8. The optical fiber line arranging guide groove capable of sensing optical signals as claimed in claim 1, wherein the hollow inverted U-shaped protrusions are made of a light-transmissive material, such that the optical detection circuits receive the optical bending loss signal refracted from the interior of the corresponding optical fiber line through the light-transmissive material when bending loss occurs to the corresponding optical fiber line.

9. The optical fiber line arranging guide groove capable of sensing optical signals as claimed in claim 1, wherein the hollow inverted U-shaped protrusions comprise at least one set of fourth holes at a side edge thereof, for accommodating the second metal contact pairs.

10. The optical fiber line arranging guide groove capable of sensing optical signals as claimed in claim 1, wherein each of the optical detection circuits further comprises an optical sensing element, for sensing at least one optical bending loss signal refracted from the interior of the corresponding optical fiber line when bending loss occurs to the corresponding optical fiber line, and respectively converting the corresponding optical bending loss signals into a current for being transmitted to the corresponding display element, wherein the display elements display different brightness respectively depending upon different current strength converted from the optical bending loss signal sensed by the corresponding optical sensing element.

11. The optical fiber line arranging guide groove capable of sensing optical signals as claimed in claim 10, wherein the optical sensing elements are selected from a group consisting of a photoelectric diode, a photoresistor, and a phototransistor.

* * * * *